Sept. 27, 1955  E. GEDDE  2,719,037
CONTINUOUS ARTICLE FEEDING MECHANISM WITH SHIFTABLE FEED FINGERS
Filed May 29, 1951  5 Sheets-Sheet 1

INVENTOR.
ERIK GEDDE
BY
ATTORNEYS

Sept. 27, 1955          E. GEDDE          2,719,037
CONTINUOUS ARTICLE FEEDING MECHANISM WITH SHIFTABLE FEED FINGERS
Filed May 29, 1951          5 Sheets-Sheet 2

INVENTOR.
ERIK GEDDE
BY Charles H. Fine
Leland R. McCann
George W. Reiber
ATTORNEYS

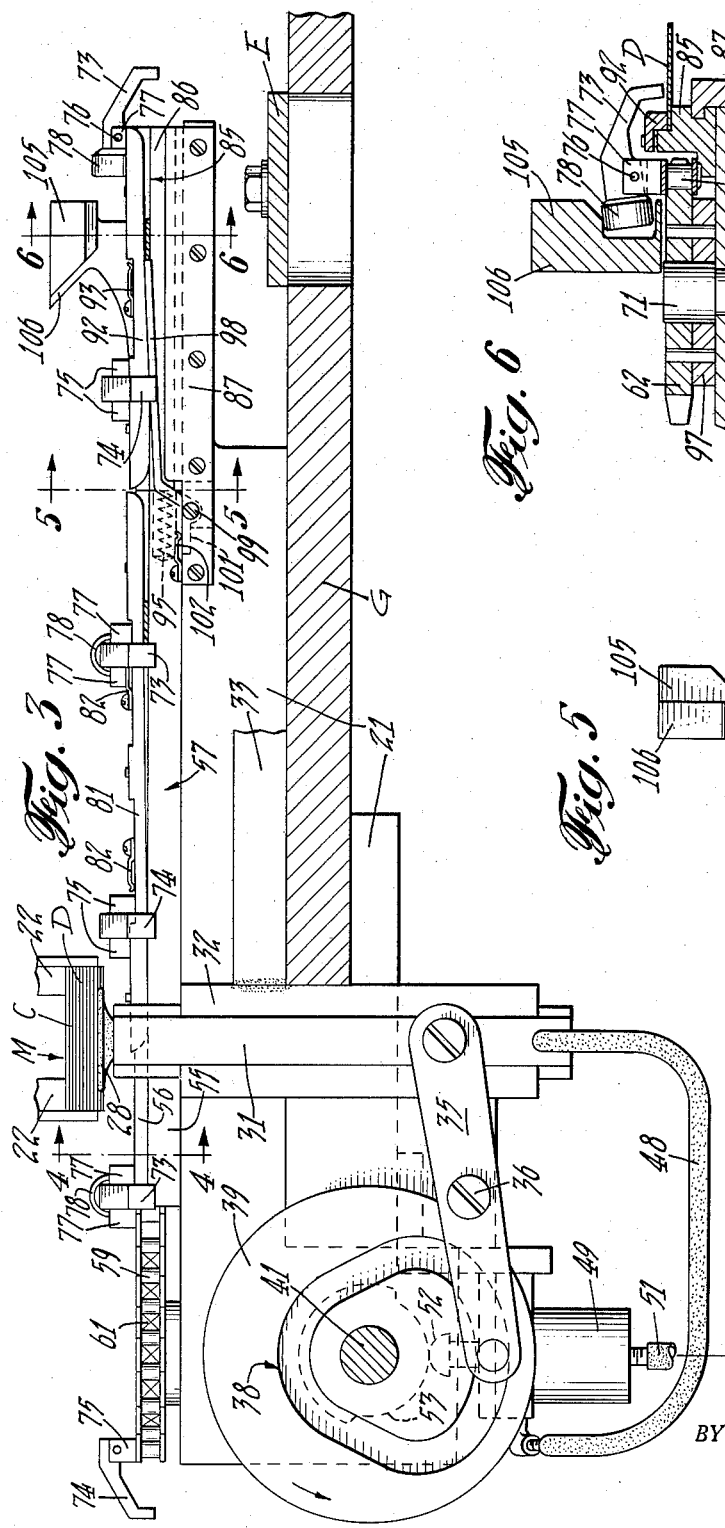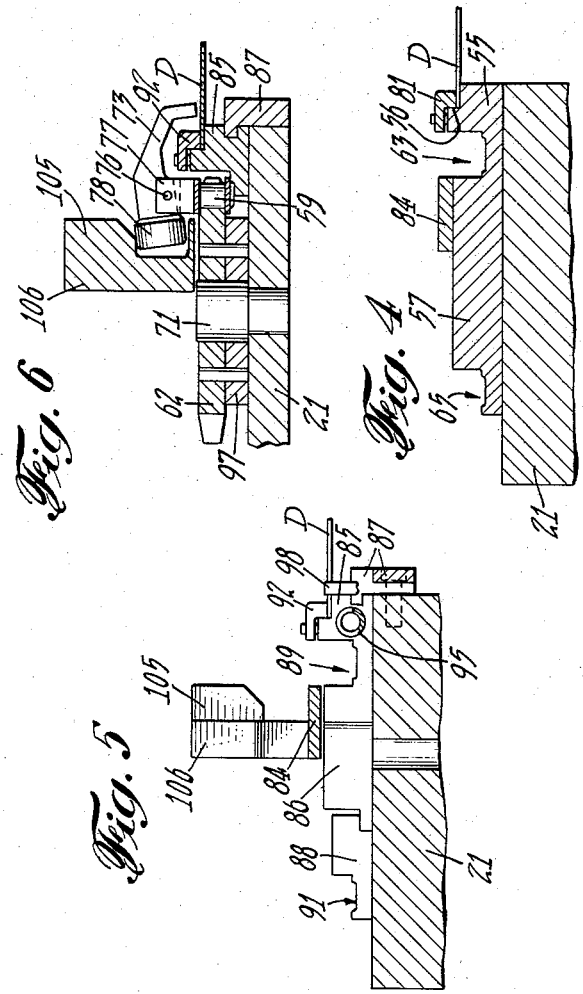

Sept. 27, 1955 E. GEDDE 2,719,037
CONTINUOUS ARTICLE FEEDING MECHANISM WITH SHIFTABLE FEED FINGERS
Filed May 29, 1951 5 Sheets-Sheet 4
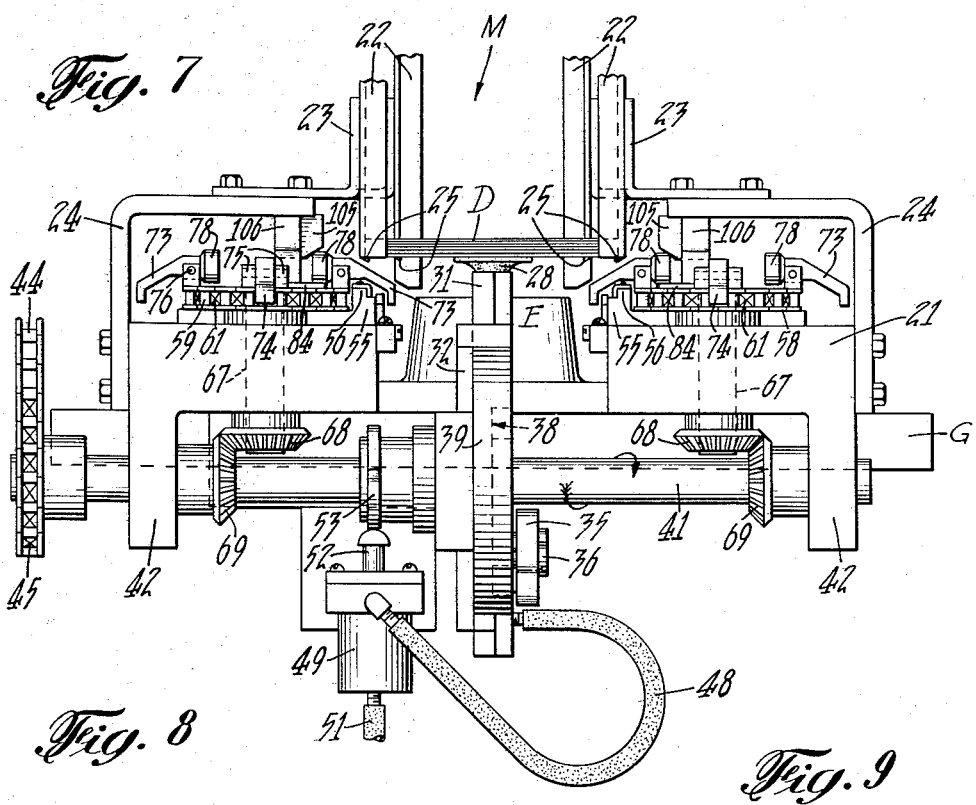
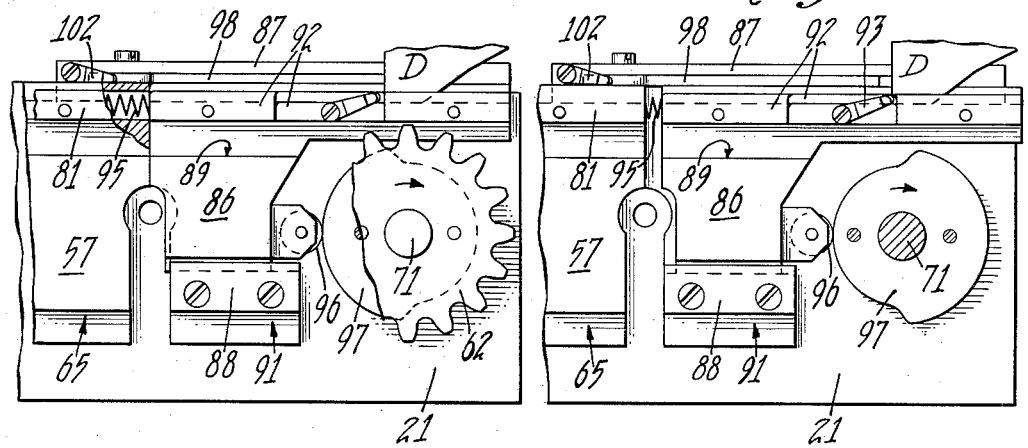
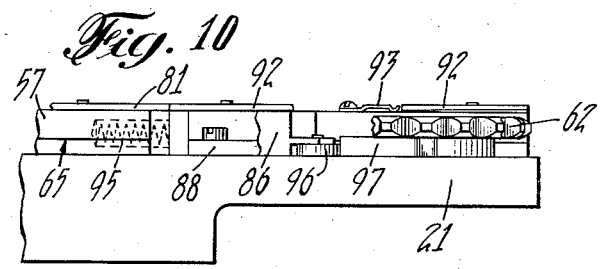
INVENTOR.
ERIK GEDDE
BY Charles H. Fane
Leland R. McCann
George W. Reiber
ATTORNEYS

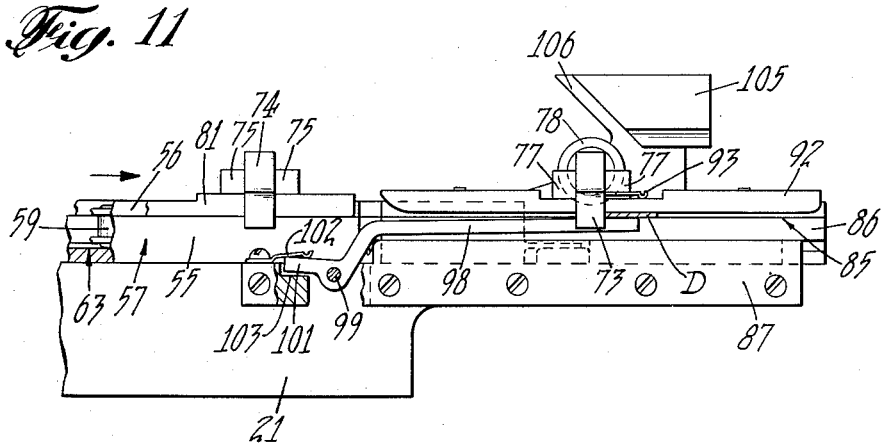
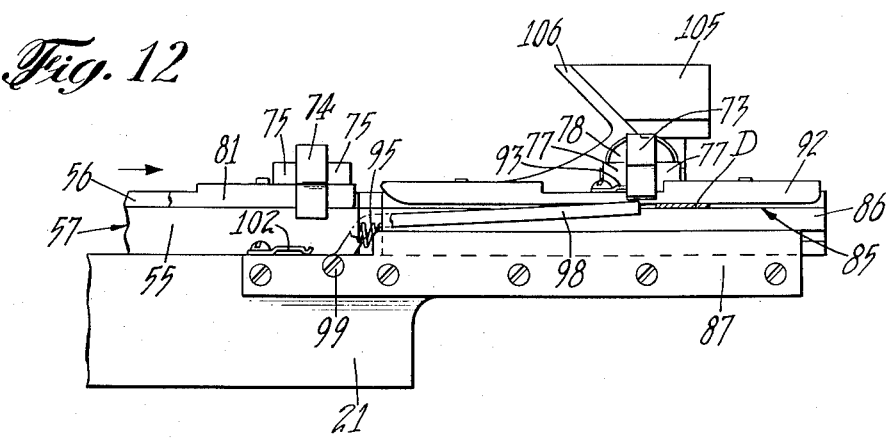
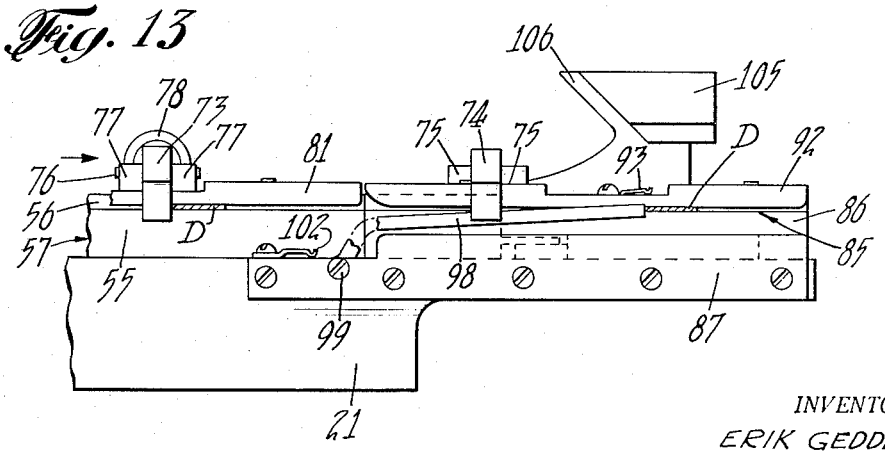

United States Patent Office 2,719,037
Patented Sept. 27, 1955

2,719,037

CONTINUOUS ARTICLE FEEDING MECHANISM WITH SHIFTABLE FEED FINGERS

Erik Gedde, Park Ridge, Ill., assignor to American Can Company, New York, N. Y., a corporation of New Jersey Application May 29, 1951, Serial No. 228,913

8 Claims. (Cl. 271—3)

The present invention relates to a mechanism for feeding articles such as flat sheets or blanks individually from a stack of such sheets and has particular reference to a continuous feed mechanism having devices for positioning and accurately aligning a sheet at a working station and for subsequently ejecting the sheet from the working station.

An object of the invention is the provision of a feeding mechanism for articles such as sheets or blanks wherein the feeding devices operate continuously and are provided with movable advancing fingers arranged to advance articles along a predetermined path of travel into a working station and, at the station, to move out of the path of travel of the articles to leave them at the station for a momentary operation thereupon.

Another object is the provision of such a feeding mechanism wherein fixed ejecting fingers trail the movable advancing fingers and operate in timed relation with the advancing fingers and with the working mechanism to eject the articles left at the working station by the advancing fingers and after the operation has been performed on the articles, thereby creating at the working station a time lag or interruption in the advancement of the articles by a continuously operating feeding mechanism.

Another object is the provision in such a feeding mechanism of article locating or gauging devices wherein articles fed into the working station are accurately located or gauged prior to the performance of the operation upon the articles.

Still another object is the provision of such a feeding mechanism which is simple in construction and economical to build and maintain while being efficient in operation and particularly adapted to high speed feeding operations.

Yet another object is the provision of such a feeding mechanism which eliminates vibration and thereby provides for smoother and more accurate feeding and locating of the sheets during their advancement.

Numerous other objects and advantages of the invention will be apparent as it is better understood from the following description, which, taken in connection with the accompanying drawings, discloses a preferred embodiment thereof.

Referring to the drawings:

Fig. 3 is a longitudinal section taken substantially along the broken line 3—3 in Fig. 2, with parts broken away;

Figs. 4, 5 and 6 are enlarged fragmental transverse sections taken substantially along the lines 4—4, 5—5, 6—6 in Fig. 3;

Fig. 7 is an end view of the feeding mechanism as viewed from the left in Fig. 3, with parts broken away;

Figs. 8 and 9 are enlarged fragmentary top plan details of certain of the parts shown at the right in Fig. 2;

Fig. 10 is a side view of the parts shown in Fig. 8, with parts broken away; and Figs. 11, 12 and 13 are enlarged schematic views of certain of the parts shown at the right in Fig. 3, the views showing different positions of the moving parts as an incident to feeding and locating a sheet at a working station.

Figure 1:
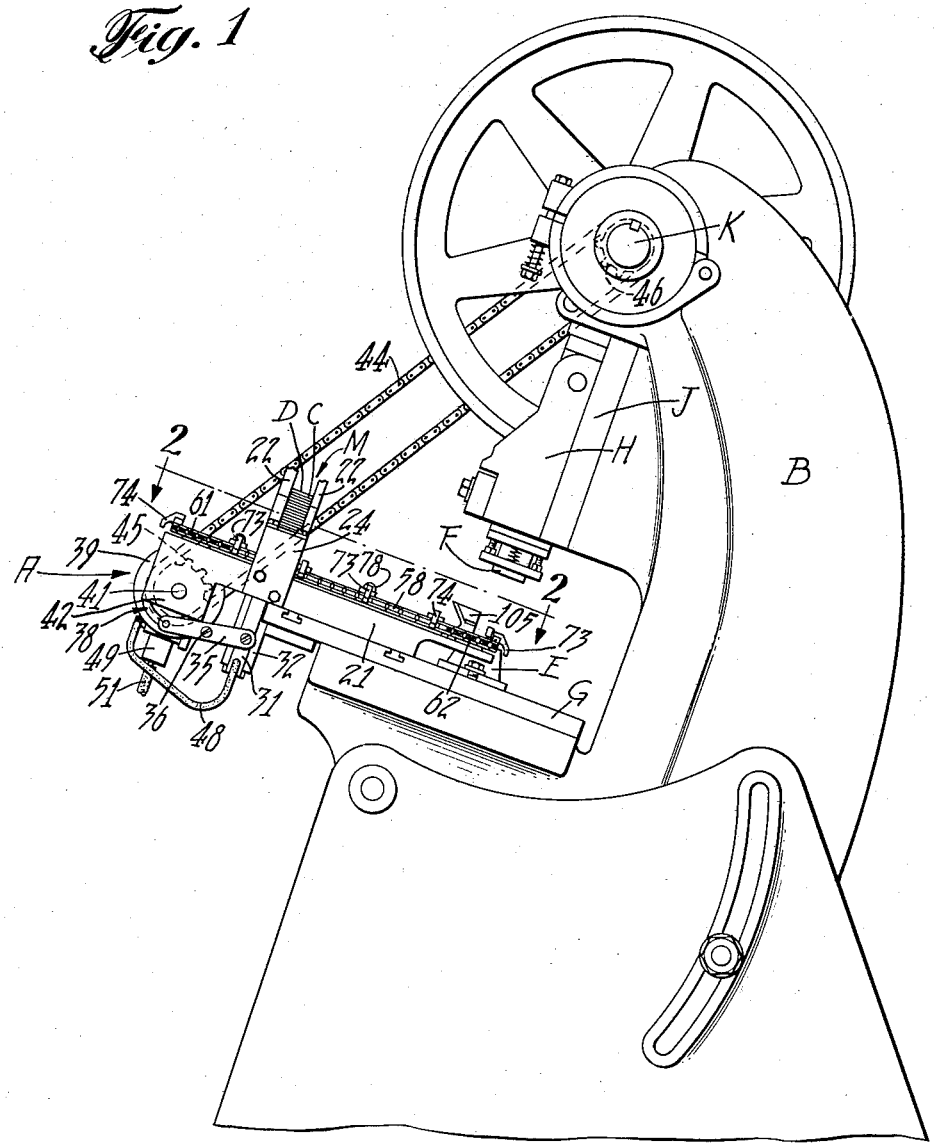
Figure 1 is a side view of a machine having attached to it a feeding mechanism embodying the instant invention, parts of the machine being broken away.
Figure 2:
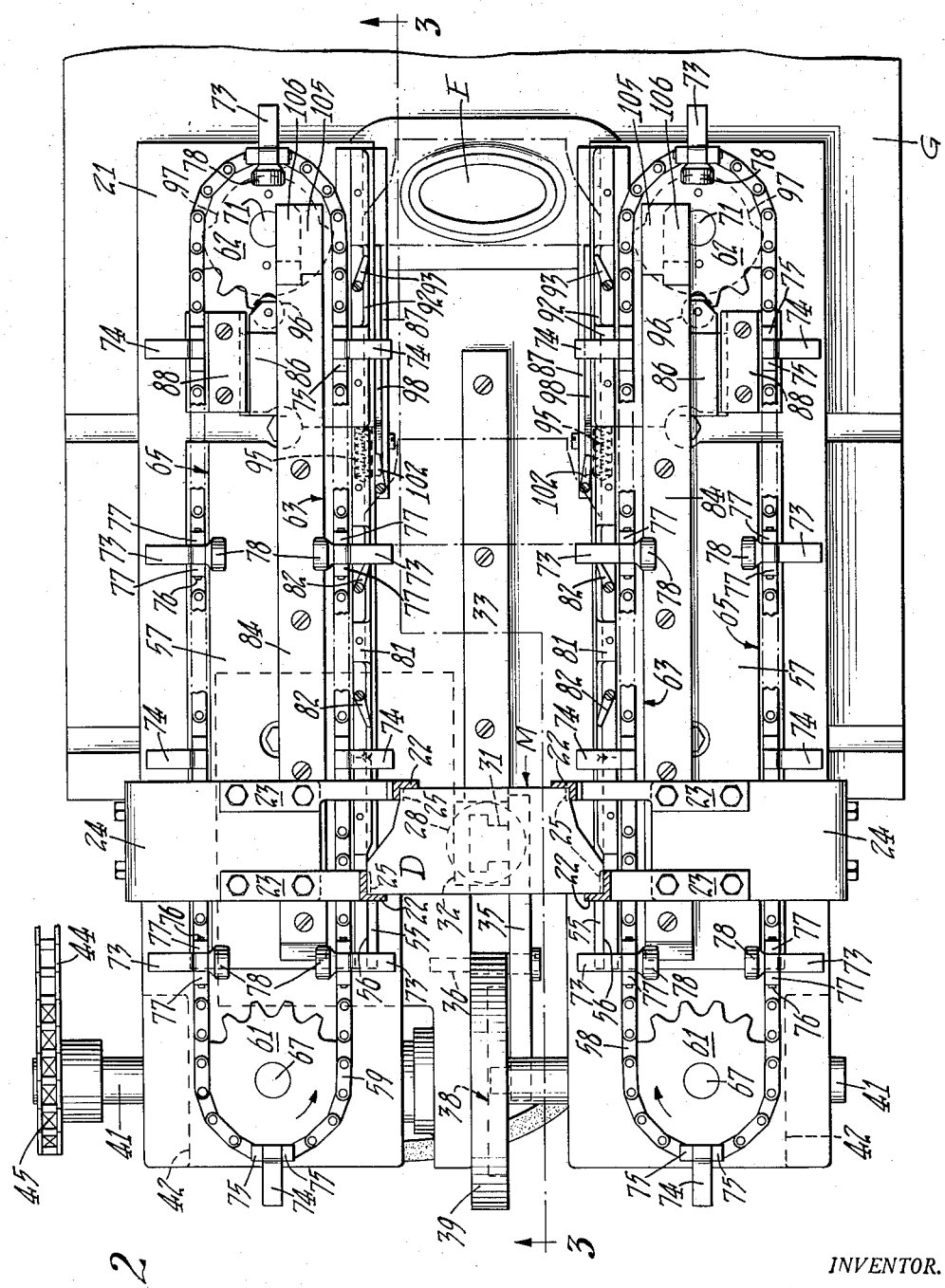
Fig. 2 is an enlarged top plan view of the feeding mechanism as taken substantially along a plane indicated by the lines 2—2 in Fig. 1.

As a preferred or exemplary embodiment of the instant invention the drawings illustrate a sheet or blank feeding mechanism A (Fig. 1) mounted on a conventional punch press B for the purpose of feeding from a stack C, flat metallic blanks D (Fig. 2), such as scroll shear blanks or other irregular or regular shaped blanks or scrap pieces. The blanks D fed from the stack C are advanced individually into the punch press B and at a working station in the press are positioned between a lower stationary die E (Figs. 1 and 2) and a movable upper punch F (Fig. 1) for stamping or cutting a can part or other article from the blanks.

The lower stationary die E is secured to a bolster plate G fastened to the bed of the press. The upper movable punch F is carried in a vertically reciprocable punch head H which operates in a slideway J formed in the press frame. The head is reciprocated in the usual manner through a rotatable crankshaft K.

The feeding mechanism A comprises a substantially rectangular flat frame 21 (Figs. 1, 2 and 3) which is disposed adjacent the lower stationary die E and which is secured to the bolster plate G. A portion of the frame 21 extends outwardly beyond and overhangs the bolster plate.

The stack C of blanks D to be fed individually into the punch press B is located adjacent the outer overhanging end of the frame 21 and in longitudinal alignment with the lower stationary die E in the press. The stack of blanks is retained in an upright magazine M (Fig. 7) defined by a plurality of substantially vertical angle iron guide rods 22, the lower ends of which are secured by braces 23 (Fig. 7) to bridge brackets 24 secured to the frame 21. The blanks D are supported in stacked relation in the magazine by short inwardly extending lugs 25 (Fig. 7) formed on the lower ends of the guide rods 22.

The blanks D are fed or separated individually from the bottom of the magazine M by a vertically movable separator element or suction cup 28 (Figs. 2, 3 and 7) located beneath the magazine and reciprocated toward and away from the magazine in time with the reciprocation of the movable upper punch F of the press B. The suction cup 28 is mounted on the upper end of a vertical hollow slide 31 carried in a vertical slideway 32 preferably welded to a support bar 33 secured to the frame 21.

Reciprocation of the slide 31 in its slideway 32 is effected preferably by cam action. For this purpose the slide adjacent its lower end is pivotally secured to an actuating lever 35 (Fig. 3). Intermediate its ends the lever 35 is carried on a pivot pin 36 secured in the frame 21 (see also Fig. 2). The outer end of the lever carries a cam roller which operates in a cam groove 38 of a face cam 39 mounted on a horizontal transverse driving shaft 41 journaled in bearings 42 formed in the frame 21.

The driving shaft 41 is continuously rotated through an endless chain 44 which operates over a sprocket 45 mounted on one end of the shaft and over a sprocket 46 (Fig. 1) mounted on the crankshaft K of the press. It is through this connection with the press crankshaft K that the driving shaft 41 and the suction cup 28 are operated in time with the reciprocation of the movable upper punch F. As the shaft 41 rotates, the cam 39 rocks the actuating lever 35 in a counterclockwise direction (as viewed in Fig. 3) and thus moves the suction cup 28 up into engagement with the lowermost blank D in the stack C. While the suction cup is in this position, a vacuum is drawn on the cup to cause the blank to adhere to the cup.

Vacuumizing of the suction cup 28 is effected by way of the hollow slide 31 and a flexible tube 48 (Figs. 3 and 7) having one end connected to the slide and in communication with its interior. The opposite end of the tube 48 is connected to a normally closed conventional poppet valve 49 secured to the frame 21 adjacent the driving shaft 41. The bottom of the valve 49 is connected by a tube 51 to any suitable source of vacuum. The valve 49 is provided with an actuating stem 52, the outer end of which rides against an edge cam 53 secured to the driving shaft 41. The cam is shaped to open the valve while the suction cup 28 is held against the lowermost blank in the stack to connect the cup with the source of vacuum and to thereby exhaust the air from the cup so that the cup will grip the blank.

At the proper time in the cycle of operation of the face cam 39, the cam rocks the actuating lever 35 in a clockwise direction (as viewed in Fig. 3) and thus lowers the suction cup 28 through a feeding stroke. This lowering of the cup 28 pulls the lowermost blank D downwardly past the magazine lugs 25 and out of the magazine M and deposits it onto a pair of spaced and parallel support rails 55 (Figs. 2, 3 and 4) having adjacent upwardly projecting guide shoulders 56. These support rails 55 are formed integrally with and along the inner edges of longitudinal guide blocks 57 secured to the top of the frame 21. The blocks extend from the magazine M toward the stationary die E of the press for the advancement of the blanks therealong. When a blank D is deposited on the support rails, the vacuum is cut off from the cup 28 and the cup is vented to release the blank from the cup. This is effected by the edge cam 53 depressing the valve stem 52 and thus closing the valve.

Advancement of the blanks D along the support rails 55 is effected by a pair of horizontally disposed spaced and parallel endless chain conveyors 58, 59 (Figs. 2 and 7) located one on each side of the magazine M adjacent the support rails and extending the full length of the frame 21. These chains operate continuously at a speed timed with the reciprocation of the suction cup 28. The chains operate over driving sprockets 61 disposed adjacent the magazine M and over idler sprockets 62 disposed adjacent the stationary die E. Intermediate the sprockets 61, 62, the inner runs of the conveyors operate in a pair of straight and parallel track grooves 63 formed in the longitudinal guide blocks 57. The outer runs of the conveyors operate in a pair of similar track grooves 65 formed in the blocks 57.

The conveyor driving sprockets 61 are mounted on the upper ends of short vertical shafts 67 journaled in bearings formed in the frame 21. The lower ends of the shafts 67 carry bevel gears 68 which mesh with bevel gears 69 mounted on the driving shaft 41. The bevel gears 68, 69 are arranged to drive the two inner runs of the conveyor chains 58, 59 in the same direction, from the magazine M toward the die E. The idler sprockets 62 are mounted on the upper ends of short vertical shouldered pins 71 (see also Fig. 6) secured in the frame 21.

At spaced intervals along the conveyor chains 58, 59, two sets of fingers are provided for propelling the blanks D, a movable, oscillatable, or pivotally mounted advancing or propelling finger 73 and a stationary or fixed ejecting finger 74. There are a plurality of these sets of fingers 73, 74 attached to each conveyor chain in oppositely or transversely aligned relation for co-operation in advancing the blanks delivered from the magazine M, the movable fingers 73 and the fixed fingers 74 alternating along the conveyor chains. Both kinds of fingers 73, 74 project beyond the conveyors and extend down into the path of travel of a blank D along the support rails 55.

The fixed ejecting fingers 74 are immovably secured to blocks 75 (Figs. 2 and 3) which extend up from and travel with the conveyor chains. The movable propelling fingers 73 are mounted on pivot pins 76 carried in pairs of bearing blocks 77 disposed in spaced relation to the fixed finger blocks 75 and which extend up from and travel with the conveyor chains. These propelling fingers 73 carry cam rollers 78.

In operation, the suction cup 28 pulls down a blank D from the magazine M, directly in front of a pair of the propelling fingers 73 (one on each of the conveyor chains 58, 59) as the fingers approach the magazine. When the blank is deposited on the support rails 55 and is released from the suction cup 28, the approaching fingers 73 engage behind the blank and advance it along the rails 55 toward the die E, the ejecting fingers 74 following or trailing in spaced relation. The advancement of the blank is continuous. During this advancement, the blank is restrained from vertical displacement by a pressure or hold down bar 81 (Figs. 2 and 3) which extends along each of the support rails 55 and is yieldably held in place by flat springs 82 secured to the tops of the guide shoulders 56 of the support rails. The blanks pass between the support rails and the pressure bars in frictional engagement therewith.

In this manner, as each set of propelling fingers 73 approaches the stack C of blanks in the magazine M, the suction cup 28 deposits a blank in front of the fingers and the fingers engage behind and advance the individually placed blanks toward the die E in a procession in spaced and timed order with the ejecting fingers 74 trailing each blank in spaced relation thereto. During this advancement of the blank, the cam rollers 78 on the propelling fingers 73 ride along a pair of straight bar cams 84 (Figs. 2 and 5) secured to the tops of the conveyor guide blocks 57. There is one of these cams for each conveyor and they extend longitudinally of the frame 21 to hold the propelling fingers 73 in position against the back edges of the blanks D being advanced.

As an advancing blank D approaches the die E its propelling fingers 73 release the blank and it is thereafter located in an accurate predetermined position over the die for a cutting or other operation. During this approach to the die E, the advancing blank D rides off the support rails 55 and rides onto a pair of short movable continuing auxiliary support rails 85 (Figs. 3, 5 and 12) formed on a pair of blank locating or gauging slides 86 which operate in longitudinal slideways defined by inner gibs 87 and outer blocks 88 secured to the frame 21.

The slides 86 and the blocks 88 are formed with clearance grooves 89, 91 for the conveyor chains 58, 59. The slides 86 are also equipped with pressure or blank friction hold-down bars 92 which extend along the movable support rails 85 and are yieldably pressed against the rails by flat springs 93 secured to the slides.

The blank locating or gauging slides 86 are disposed adjacent the die E, one on each side thereof, and are longitudinally yieldable relative to the stationary support rails 55 by reason of compression springs 95 interposed between the adjacent ends of the rails 55 and the slides 86. The slides carry cam rollers 96 (Figs. 8, 9 and 10) which are pressed by the springs 95 against edge cams 97 secured to and rotating with the conveyor sprockets 62 (see Fig. 6). The cams 97 make one revolution for each blank D advanced into the working station for positioning over the die E and actuate the slides to locate the blanks against a locating, gauging or stop finger 98 (Figs. 2, 3, 5, 8, 9, 11, 12 and 13) disposed in the path of travel of the blanks. There are two locating fingers 98, one on each side of the die E and they extend along the movable support rails 85. These fingers are mounted on pivot pins 99 which are secured in the gibs 87. The free ends or noses of the fingers extend toward the die E and terminate a predetermined spaced distance from the die. Adjacent the pivot pins 99, the fingers are formed with tails 101 (see Fig. 11) which are held yieldably by flat springs 102 against a stop ledge 103 formed in the gibs 87.

When a blank D approaches the die E under the propelling action of the propelling fingers 73 on the conveyors 58, 59 the blank is advanced with its side edges between the movable support rails 85 and the pressure bars 92 and the blank thus passes over and depresses the gauging fingers 98 as best shown in Fig. 11, the ejecting finger 74 trailing the propelling finger 73 in spaced relation thereto as shown in Fig. 11. As soon as the blank D advances beyond the terminal ends of the gauging fingers 98, the fingers snap upwardly in back of the blank as shown in Fig. 12.

Simultaneously with this action the cam rollers 78 on the propelling fingers 73 engage against a stationary releasing cam block 105 formed on a bracket 106 which extends up from each of the bar cams 84 (see also Figs. 5 and 6). The cams 105 depress the rollers 78 as the latter pass under the cams and thus rock the propelling fingers 73 upwardly out of the path of travel of the blank and away from the blank as shown in Figs. 6 and 12. With continued advancement of the conveyors 58, 59, the two propelling fingers 73 pass over the top of the blank, leaving the blank over the die E, slightly in advance of the gauging fingers 98 and the side edges of the blank frictionally gripped between the movable support rails 85 and the pressure bars 92 as shown in Fig. 12.

While the propelling fingers 73 continue to advance over the released blank D and move around the sprockets 62 to return to the outer end of the mechanism for a subsequent blank advancing cycle, the gauging cams 97 secured to the sprockets 62 push the movable gauging slides 86 outwardly or back against the force of the compression springs 95 as shown in Fig. 8. This movement of the slides carries the frictionally gripped blank back so that the rear or trailing end of the blank is moved into engagement with the terminal ends or noses of the gauging fingers 98 as best shown in Fig. 13. This engagement of the rear or trailing end of the blank with the gauging fingers arrests further backward movement of the blank and thus locates the blank accurately in a precise position over the die E. Since the two gauging fingers 98 are spaced apart transversely and engage the blank along its trailing end near its side edges, the fingers also square the blank in relation to the die E. During this remainder of the back stroke of the gauging slides 86 under action of the gauging cams 97, the blank remains stationary against the gauging fingers 98 and its side edges slip between the moving support rail 87 and the pressure bars 92 carried thereby.

Upon completion of the back stroke of the gauging slides 86, which insures accurate location of the blank D over the die E, the punch F of the press B (Fig. 1) descends upon the blank and in cooperation with the die E, cuts or otherwise operates upon the blank to perform the desired operation. During these blank locating and working operations, the ejecting fingers 74 on the moving conveyor chains 58, 59 are moving toward the now stationary blank and as the punch F rises away from the worked blank on the die E, the ejecting fingers 74 catch up with the blank and engage behind its back edge, taking the place of the propelling fingers 73 and continues the interrupted advancement of the blank, thus removing it from the die. This movement is just sufficient to eject the worked blank from the die E and to push the blank into a chute or other place of deposit. In traveling around the sprockets 62 the ejecting fingers 74 leave the blank at its place of deposit or discharge and return toward the outer end of the mechanism following the propelling fingers 73 for a subsequent blank ejecting operation. This completes the cycle of operation of the mechanism.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an article feeding mechanism, the combination of a conveyor disposed adjacent a path of travel leading toward a working station, actuating means for moving said conveyor, a propelling finger carried on said conveyor and extending into said path of travel for advancing an article along said path of travel and into said working station, said finger being movable relative to said conveyor, finger shifting means adjacent said working station for shifting said finger out of said path of travel at said working station to leave said article at said station for an operation thereupon, and an ejecting finger also carried on said conveyor in spaced trailing relation to said propelling finger and extending into said path of travel for engaging and removing said article from said working station after said operation thereupon.

2. In an article feeding mechanism, the combination of a conveyor disposed adjacent a path of travel leading toward a working station, actuating means for moving said conveyor, a propelling finger carried on said conveyor and extending into said path of travel for advancing an article along said path of travel and into said working station, said finger being movable relative to said conveyor, finger shifting means adjacent said working station for shifting said finger out of said path of travel at said working station to leave said article at said station for an operation thereupon, end gauging means disposed adjacent said working station and rearwardly of the trailing end of the article at said station for engaging said trailing end of the article and precisely locating said article at said station, holding means adjacent said path of travel for yieldably gripping opposite surfaces of said article, and means for shifting said holding means rearwardly toward said end gauging means to abut and locate the trailing end of said gripped article against said gauging means.

3. In an article feeding mechanism, the combination of a pair of spaced and parallel conveyors leading toward a working station, means for actuating said conveyors in unison and in the same direction toward said station, a plurality of propelling fingers carried on each of said conveyors for co-operation in pairs for advancing articles in spaced relation along a path of travel between said conveyors to deliver said articles individually and successively into said station, said fingers extending into said path of travel and being movable relative to said conveyors, finger shifting means adjacent said working station for shifting said fingers out of said path of travel at said working station to leave said articles at said station for an operation thereupon, and a plurality of ejecting fingers also carried on each of said conveyors, said ejecting fingers alternating with said propelling fingers in spaced trailing relation thereto and extending into said path of travel for co-operation in pairs engaging and removing said articles individually after said operation.

4. In a mechanism for feeding flat articles, the combination of a conveyor disposed adjacent a path of travel leading toward a working station, actuating means for moving said conveyor, a propelling finger carried on said conveyor for engaging a rear edge of an article for advancing it along said path of travel and into said working station, a depressible gauging finger disposed in said path of travel and having a terminal gauging nose located in a predetermined relation to said working station rearwardly of said rear edge of the article in said station, and means engageable against the side margins of said article at said station for moving said rear edge of the article back against said gauging nose of the gauging finger to position the article accurately at said working station.

5. In a mechanism for feeding flat articles, the combination of a conveyor disposed adjacent a path of travel leading toward a working station, actuating means for moving said conveyor, a propelling finger carried on said conveyor for engaging an article to advance it along said path of travel and into said working station, a depressible gauging finger disposed in said path of travel and having a terminal gauging nose located in a predetermined relation to said working station rearwardly of the article in said station, movable supports disposed adjacent said gauging finger for receiving each article advanced into said station, hold-down bars secured to said supports for frictionally holding the side margins of said article against said supports, and means for shifting said supports rearwardly toward said gauging finger to locate said frictionally held article against the gauging nose of said gauging finger to position it accurately at said working station.

6. In a mechanism for feeding flat articles along a predetermined path, a gauging slide having an article supporting surface below said path, a pressure bar having an article engaging surface above and facing said supporting surface, said bar being biased toward and reciprocable together with said gauging slide, a yieldable gauging finger disposed rearwardly of said slide and biased into said path, a propelling finger for advancing an article along said path across and beyond said gauging finger into a frictionally retained position between said surfaces of the gauging slide and pressure bar with the trailing end of said frictionally retained article slightly forward of said article gauging finger, means for retracting said propelling finger from engagement with the frictionally retained article, and means for reciprocating said gauging slide and pressure bar rearwardly to abut the trailing end of said retained article with said gauging finger to accurately locate the article for an operation to be performed thereon.

7. In a mechanism for feeding flat articles along a predetermined path, a gauging slide having an article supporting surface below said path, a pressure bar having an article engaging surface above and facing said supporting surface, said bar being biased toward and reciprocable together with said gauging slide, a yieldable gauging finger disposed rearwardly of said slide and biased into said path, a propelling finger for advancing an article along said path across and beyond said gauging finger into a frictionally retained position between said surfaces of the gauging slide and pressure bar with the trailing end of said frictionally retained article slightly forward of said article gauging finger, means for retracting said propelling finger from engagement with the advanced frictionally retained article, means for reciprocating said gauging slide and pressure bar rearwardly to abut the trailing end of said retained article with said gauging finger to accurately locate the article for an operation to be performed thereon, and an ejecting finger movable into engagement with the article after completion of the operation to eject said article from said slide and pressure bar.

8. In an article feeding mechanism, the combination of a propelling finger movable toward a working station for advancing a said article along a path of travel to said station, means for delivering articles individually into said path of travel in timed relation with the advancement of said propelling finger, gauging means disposed rearwardly of said station and projecting into said path of travel, finger shifting means adjacent said working station for shifting said propelling finger out of said path of travel at said working station to leave said article at said station with the trailing end of the article slightly in advance of said gauging means, means for yieldably gripping a said article at the station and for moving the gripped article rearwardly into gauging contact with said gauging means to accurately position the article for an operation thereupon, and means for ejecting said article after completion of said operation.

References Cited in the file of this patent

UNITED STATES PATENTS

| 955,112 | Abrams | Apr. 12, 1910 |
| 2,248,004 | Lipton | July 1, 1941 |
| 2,335,064 | Kabel | Nov. 23, 1943 |
| 2,374,698 | Pechy | May 1, 1945 |